United States Patent
Singh et al.

(10) Patent No.: US 9,676,876 B2
(45) Date of Patent: Jun. 13, 2017

(54) CATALYST FOR POLYMERIZATION OF OLEFINS AND PROCESS THEREOF

(71) Applicant: INDIAN OIL CORPORATION LIMITED, Mumbai, Maharashtra (IN)

(72) Inventors: Gurmeet Singh, Faridabad (IN); Naresh Kumar, Faridabad (IN); Sukhdeep Kaur, Faridabad (IN); Gurpreet Singh Kapur, Faridabad (IN); Shashi Kant, Faridabad (IN); Biswajit Basu, Faridabad (IN); Ravinder Kumar Malhotra, Faridabad (IN); Svein Nenseth, Stathelle (NO); Jarmo Lindroos, Stathelle (NO)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 134 days.

(21) Appl. No.: 14/417,099

(22) PCT Filed: Sep. 24, 2013

(86) PCT No.: PCT/IB2013/058791
§ 371 (c)(1),
(2) Date: Jan. 23, 2015

(87) PCT Pub. No.: WO2014/045258
PCT Pub. Date: Mar. 27, 2014

(65) Prior Publication Data
US 2015/0203604 A1  Jul. 23, 2015

(30) Foreign Application Priority Data

Sep. 24, 2012  (IN) .......................... 2244/MUM/2012

(51) Int. Cl.
*C08F 4/76*   (2006.01)
*C08F 4/10*   (2006.01)
(Continued)

(52) U.S. Cl.
CPC .................. *C08F 4/76* (2013.01); *C08F 4/10* (2013.01); *C08F 4/52* (2013.01); *C08F 10/06* (2013.01)

(58) Field of Classification Search
CPC .... C08F 4/76; C08F 4/10; C08F 10/06; C08F 4/52
See application file for complete search history.

(56) References Cited

U.S. PATENT DOCUMENTS

| 4,156,063 A | 5/1979 | Giannini et al. |
| 4,174,299 A | 11/1979 | Giannini et al. |

(Continued)

FOREIGN PATENT DOCUMENTS

| EP | 0125911 A1 | 11/1984 |
| EP | 0 926 165 A1 | 6/1999 |

(Continued)

*Primary Examiner* — Catherine S Branch
(74) *Attorney, Agent, or Firm* — Maschoff Brennan (57) ABSTRACT

The present invention provides a process for preparation of a solid titanium catalyst component for use as pro-catalyst for a Ziegler-Natta catalyst system. The solid titanium catalyst component comprises a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 μm, characterized by a three point particle size distribution of D10 in the range of 1 to 10 μm; D50 in the range of to 25 μm and D90 in the range of 15 to 50 μm. The present invention also provides a 15 Ziegler-Natta catalyst system comprising the solid titanium catalyst component and the method of polymerizing and/or copolymerizing olefins by using the Ziegler-Natta catalyst system.

24 Claims, 2 Drawing Sheets (51) Int. Cl.
*C08F 4/52* (2006.01)
*C08F 10/06* (2006.01)

(56) References Cited

U.S. PATENT DOCUMENTS

| | | |
|---|---|---|
| 4,226,741 A | 10/1980 | Luciani et al. |
| 4,277,589 A | 7/1981 | Giannini et al. |
| 4,315,836 A | 2/1982 | Albizzati et al. |
| 4,331,561 A | 5/1982 | Luciani et al. |
| 4,473,660 A | 9/1984 | Albizzati et al. |
| 4,564,606 A | 1/1986 | Best |
| 4,724,255 A | 2/1988 | Lofgren et al. |
| 4,866,022 A | 9/1989 | Arzoumanidis et al. |
| 4,946,816 A | 8/1990 | Cohen et al. |
| 4,988,656 A | 1/1991 | Arzoumanidis et al. |
| 4,990,479 A | 2/1991 | Ishimaru et al. |
| 5,013,702 A | 5/1991 | Arzoumanidis et al. |
| 5,124,297 A | 6/1992 | Arzoumanidis et al. |
| 5,296,431 A | 3/1994 | Hungenberg et al. |
| 5,459,116 A | 10/1995 | Ro et al. |
| 5,658,840 A | 8/1997 | Kölle et al. |
| 5,844,046 A | 12/1998 | Ohgizawa et al. |
| 6,034,023 A | 3/2000 | Kersting et al. |
| 6,034,025 A | 3/2000 | Yang et al. |
| 6,107,231 A | 8/2000 | Hüffer et al. |
| 6,420,499 B1 | 7/2002 | Garoff et al. |
| 6,706,655 B2 | 3/2004 | Garoff et al. |
| 6,849,700 B1 | 2/2005 | Garoff et al. |
| 7,026,265 B2 | 4/2006 | Leinonen et al. |
| 7,220,696 B2 | 5/2007 | Matsunaga et al. |
| 7,232,785 B2 | 6/2007 | Spaether et al. |
| 7,608,555 B2 | 10/2009 | Garoff et al. |
| 7,659,223 B2 | 2/2010 | Leinonen et al. |

FOREIGN PATENT DOCUMENTS

| | | |
|---|---|---|
| EP | 1 336 625 A1 | 8/2003 |
| EP | 1 598 379 A1 | 11/2005 |

CATALYST FOR POLYMERIZATION OF OLEFINS AND PROCESS THEREOF

FIELD OF INVENTION

The present invention discloses a catalyst system for polymerization of olefins. More particularly, the present invention discloses a simple economical process for preparation of a solid titanium catalyst component of desired properties for use as pro-catalyst for a Ziegler-Natta catalyst system.

BACKGROUND OF THE INVENTION

Ziegler-Natta (ZN) catalyst systems are well known for their capability to polymerize olefins. They in general consist of a support which mostly is magnesium based onto which titanium component has been added along with organic compound known as internal donor. This catalyst when combined with co-catalyst and/or external donor comprise of the complete ZN catalyst system.

Ziegler-Natta catalyst system which typically consists of transition metal halide normally titanium halide supported on metal compound which is typically magnesium dichloride. Along with transition metal, also there is organic component known as internal electron donor that plays a typical role during catalyst synthesis and polymerization. $MgCl_2$ carrier, where the $MgCl_2$ is in active form, can be created by various methodologies. One of the methods is precipitating the $MgCl_2$ from an organic solution where magnesium is present as a soluble compound. The soluble magnesium compound can be achieved either by starting from Mg metal and treating it with a suitable alcohol in the presence of iodine, or starting from a magnesium alkyl and treating it with an alcohol. This step is then followed by chlorination of Mg alkyl or alkoxy compounds by a chlorination agent. The magnesium carrier can also be precipitated in the form of 'ready-made' $MgCl_2$. In that case the $MgCl_2$ has to be dissolved first in some suitable donor compound and then precipitated in hydrocarbon solvent. The $MgCl_2$ support material can also be precipitated by chlorinating a soluble magnesium alkyl compound simply by treating it with chlorine gas or hydrochloric acid. Once the desired specification of carrier is obtained, this is generally followed by titanation procedure which finally results in the catalyst synthesis.

U.S. Pat. No. 4,277,589 of Montedison & Mitsui describes a process of solid catalyst based on magnesium ethanol adduct as the starting material followed by the addition of electron donor at 60° C. in halogenating agent. The resultant solid component is isolated and then treated with titanium compound at higher temperature and then filtered. The above step is repeated thrice afterwards hydrocarbon solvent. The magnesium ethanol complex has variation in ethanol complexation ranging from 2 to 6. The halogenating reagent that has been used is aluminum alkyl based.

U.S. Pat. Nos. 4,473,660, 4,156,063, 4,174,299, 4,226,741, 4,315,836 and 4,331,561 of Montedison describes a process magnesium chloride ethanol adduct has been halogenated using aluminum alkyls and then treatment with donor followed by titanium component to give solid catalyst. The variation in electron donor on polymerization is also disclosed.

U.S. Pat. No. 7,659,223B2 of Borealis describes the process for preparing olefin catalyst based on a liquid/liquid two phase system (emulsion) where no separate carrier materials are needed in order to get solid catalyst particles. The catalyst particles have predetermined size range and formed through solubilizing the magnesium higher alcohol complex and in situ generation of internal donor followed by addition of titanium, emulsifier and turbulence minimizing agent. Addition of alkyl aluminum is also done which provides the addition stability to the catalyst to work at higher temperatures. The produced catalyst has excellent morphology, good particle size distribution and activity maximum at higher temperature. One disadvantage of the in situ generation of internal donor is the variation in the composition of the internal donor.

U.S. Pat. No. 7,608,555 describes a process of synthesizing catalyst in a controlled manner leading to control over desired chemical composition and morphology. This is also based on emulsion methodology but here the dispersion phase is taken to be immiscible and inert with respect to the media for example perfluorinated organic solvents as dispersing phase. Although the advantage is indeed on the catalyst morphology and chemical composition control but it increases the number of steps for catalyst synthesis and in situ generation of internal donor leads to the variation in the composition of the internal donor.

U.S. Pat. No. 6,420,499 describes the process where the catalyst is synthesized without producing harmful byproducts such as titanium alkoxy trichloride or requires large amounts of titanation reagent as well as washing solvent. The resultant catalyst synthesized from large number of steps has good activity. There is usage of titanium less magnesium compound containing magnesium, halogen and alkoxy which is treated with organic chloride to in situ generate the internal donor followed by titanation. This process does not involve the usage of emulsifier but in situ generation of internal donor has the disadvantage of the variation in the composition of the internal donor.

U.S. Pat. No. 6,849,700 describes the process where magnesium alkoxide, carboxylic acid halide and titanium tetrahalide are obtained as dissolved reaction product and then are precipitated in an aromatic hydrocarbon and are settled by either adding an aliphatic hydrocarbon to the precipitated reaction mixture or by precipitating and settling the dissolved reaction product with a mixture of an aliphatic and an aromatic hydrocarbon. Here again disadvantage is the number of steps are involved in the washing of intermediate and final product.

U.S. Pat. No. 6,706,655 discloses the method of preparation of an olefin polymerization catalyst component where there is formation of a new polymerization catalyst component. In the process, magnesium dialkyl or dihalide or alkyl alkoxide is reacted with an alcohol and the reaction product is reacted with an unsaturated dicarboxylic acid dihalide and a titanium tetrahalide. The catalysts displays good activity and morphology when a polyhydric alcohol such as ethylene glycol. This process has the disadvantage of in situ generation of multiple new types of internal donors and involves large number of steps.

U.S. Pat. No. 7,026,265 discloses the process for the preparation olefin polymerization catalyst which consists of magnesium dihalide, titanium tetrahalide and a carboxylic acid ester, in which the precursors of its constituents are reacted in solution from which the component is precipitated. This precipitation is being supplemented by co-precipitation of one or more oligoesters of the carboxylic acid formed in a controlled manner. This new methodology leads to improved polymer morphology and product composition consistency.

U.S. Pat. No. 7,220,696 of Mitsui Chemicals discloses a process of synthesizing the catalyst system by reacting a solid adduct of magnesium halide with alcohol and an internal electron donor which is again reacted with the internal electron donor having two or more ether linkages and finally treated with titanium compound once or many times in divided portions while suspending in an inert hydrocarbon solvent. There are large numbers of steps involved in going from initial to final stage of catalyst synthesis.

U.S. Pat. No. 4,990,479 discloses the catalyst system comprising of magnesium, titanium and halogen and phthalate based internal donor along with organoaluminum compound and organosilicon compound containing a cyclopentyl group, cyclopentenyl group, cyclopentadienyl group or their derivative to produce polymers having high stereoregularity and narrow MWD. The catalyst synthesis involves the usage of magnesium halide and higher alcohol to form soluble adduct to which phthalic anhydride is added followed by titanium component. Hence there is the process of in situ internal donor generation. Further this is contacted with phthalate based organic compound before finally treating it again with titanium component. The two $TiCl_4$ treatment steps wash away all the side products and after the final hydrocarbon wash, the catalyst exhibit composition having predominantly amorphous $MgCl_2$. The main disadvantage is the large number of steps involved in catalyst synthesis.

U.S. Pat. No. 5,844,046 of Mitsui focuses on the use of external donors to achieve a broad MWD but it also describes the preparation of solid catalyst components. The catalyst synthesis involves the usage of magnesium halide and higher alcohol to form soluble adduct to which phthalic anhydride is added followed by titanium component. Further it is reacted with phthalate based internal donor followed by filtration of solid component under hot conditions which is again treated with titanium component. The final product is washed with hydrocarbon. The amorphous $MgCl_2$ is generated through precipitation of the soluble magnesium chloride alcohol adduct through titanation. Also there is in situ internal donor generation step which gives variation in the composition of the internal donor.

Mitsui EP0125911B1 discloses the process of catalyst synthesis which involves the dissolving $MgCl_2$ with 2-ethylhexanol (EHA) together with di-isobutylphthalate as internal donor and then precipitating it using ethyl aluminum sesquichloride leading to formation of amorphous $MgCl_2$. The solid portion is treated with titanium component twice and then washed with hydrocarbon. This type of a catalyst synthesis requires a waste disposal system for the catalyst side product and a recirculation system for $TiCl_4$ and a recirculation system for the wash hydrocarbons.

BASF U.S. Pat. No. 6,034,023 discloses a catalyst containing an aluminum oxide/silica support, titanium compound ($TiCl_4$), magnesium compound, halogen and a carboxylic ester. The magnesium dialkyl is contacted with support in an inert solvent and then treated with a strong chlorinating agent to form amorphous $MgCl_2$. This was followed by treatment with titanium compound and internal donor that is phthalate based. For the washing purpose, the chemical activation of catalyst is carried by using $TiCl_4$ in toluene. This process involves large number of steps and also usage of titanium component during washing.

U.S. Pat. Nos. 5,658,840 and 5,296,431 both describes the similar catalyst synthesis process where the magnesium dialkyl is contacted with support in an inert solvent and then treated with a strong chlorinating agent to form amorphous $MgCl_2$. Before the titanium compound is added, ethanol is added to reduce the reducing power of dialkyl magnesium. This was followed by treatment with titanium compound and internal donor that is phthalate based.

U.S. Pat. No. 5,296,431 discloses that the treatment of the resultant catalyst with butyl lithium before polymerization improves the fine generation.

U.S. Pat. No. 5,658,840 discloses another step to remove inert solvent from the catalyst through usage of first filtration and then applying a pressure difference at temperatures of not more than 100° C. to obtain free-flowing and storable catalysts having high productivity and stereospecificity.

U.S. Pat. No. 6,107,231 also disclose the similar methodology of synthesizing the catalyst as the above mentioned patents. Here also the dialkylmagnesium is first contacted with the support which is silica having spheriodal morphology and then chlorinated using HCl gas leading to formation of amorphous $MgCl_2$. This was followed by treatment with titanium compound and internal donor that is phthalate based. For the washing purpose, the chemical activation of catalyst is carried by using $TiCl_4$ in different solvent systems having different polarity. The teaching of this patent is the fact that usage of aromatic solvent during chemical activation gives catalyst systems which produce polymers having reduced xylene and chlorine content. These types of processes generally give high fines during polymerization which is the main disadvantage. Here in all the above patents, the internal donor is added along with the titanium component.

U.S. Pat. Nos. 4,946,816, 4,866,022, 4,988,656, 5,013,702, and 5,124,297 are describing the common processes for producing catalysts comprising of making soluble magnesium compound from a magnesium carboxylate or magnesium alkylcarbonate. Then precipitating magnesium in the presence of transition metal halide and an organosilane was followed by reprecipitating the solid components by the use of a mixed solution containing tetrahydrofuran. Finally, reacting the reprecipitated particles with transition metal compounds and internal electron donor compounds, to produce catalyst having good morphology. These processes have the disadvantage of having too many steps in the production of the catalyst.

U.S. Pat. No. 7,232,785 of ABB Lummus describes a process of catalyst synthesis which involves large number of steps. The invention describes a Ziegler-Natta PP catalyst based on silica carrier with quite high polymerisation activity. In the catalyst preparation a silica support is used, which is then treated with a hydrocarbon soluble organomagnesium compound (dialkylmagnesium in ether and heptane). The organomagnesium compound in the solid catalyst is further converted into $MgCl_2$ by using HCl. After the treatment with ethanol, titanium compound followed by phthalate based internal donor is added. This is followed by filtration, washing and chemical activation by using titanium compound in aromatic solvent. Here an entirely different process for generation of $MgCl_2$ is being followed.

U.S. Pat. No. 5,459,116 of Samsung discloses a catalyst synthesis process which involves the treatment of anhydrous magnesium chloride with higher alcohol to form soluble complex to which internal electron donor having hydroxyl and ester group is added. The resultant solution is then treated with titanium compound and then washed to remove impurities. The addition of new internal donors can also be done along with soluble organomagnesium compound. Such catalyst synthesis process has the disadvantage of involving large number of steps.

U.S. Pat. No. 6,034,025 describes the catalyst synthesis process where anhydrous magnesium chloride is treated with cyclic ether as internal electron donor along with mixture of lower alcohols to form soluble organomagnesium compound which is further treated with titanium tetrachloride. After separation of supernatant, titanation in toluene was done twice followed by washing. The variation in mixture of alcohol goes from lower alcohol to higher alcohol combinations. These processes are liable to have large number of steps in the production of the catalyst.

However, to overcome the above mention problem there is a need of a simple and economical process involving fewer number of steps for the purpose of synthesizing a catalyst for polymerization of olefins, wherein the catalyst system shows excellent polymerization activity and stereoregularity.

SUMMARY OF INVENTION

Accordingly the present invention provides a process for preparation of a solid titanium catalyst component for use as pro-catalyst for a Ziegler-Natta catalyst system, said process comprises:
(a) contacting a dialkyl magnesium compound represented by R'R"Mg with a magnesium solubilizing compound to form a reaction mixture, wherein each of R' and R" is a hydrocarbon group having $C_1$-$C_{20}$ carbon atoms, and wherein contacting the dialkyl magnesium compound with the magnesium solubilizing compound results in formation of first reaction mixture comprising magnesium alkoxide in the reaction mixture;
(b) adding a titanium compound represented by $Ti(OR''')_p X_{4-p}$, where X is a halogen atom; R''' is a hydrocarbon group and p is an integer having value less than or equal to 4 to convert the magnesium alkoxide in the reaction mixture to form second reaction mixture;
(c) adding at least one internal electron donor either after step (a) or after step (b) to obtain a catalyst component; and
(d) activating the catalyst component using a solution comprising a titanium compound and an inert solvent and recovering a solid titanium catalyst component.

In one embodiment of the present invention, a solid titanium catalyst component use as pro-catalyst for a Ziegler-Natta catalyst system comprises a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 µm, characterized by a three point particle size distribution of D10 in the range of 1 to 10 µm; D50 in the range of 5 to 25 µm and D90 in the range of 15 to 50 µm.

The present invention also provides a Ziegler-Natta catalyst system and the catalyst system comprises a combination of at least one organoaluminum compound, at least one external electron donor and a solid titanium catalyst component comprising a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 µm, characterized by a three point particle size distribution of D10 in the range of 1 to 10 µm; D50 in the range of 5 to 25 µm and D90 in the range of 15 to 50 µm.

The present invention also provides a method of polymerizing and/or copolymerizing olefins, said method comprising the step of contacting an olefin having C2 to C20 carbon atoms under a polymerizing condition with a Ziegler-Natta catalyst system, said catalyst system comprising a combination of at least one organoaluminum compound, at least one external electron donor and a solid titanium catalyst component comprising a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 µm, characterized by a three point particle size distribution of D10 in the range of 1 to 10 µm; D50 in the range of 5 to 25 µm and D90 in the range of 15 to 50 µm.

DETAILED DESCRIPTION OF INVENTION

Figure 1:
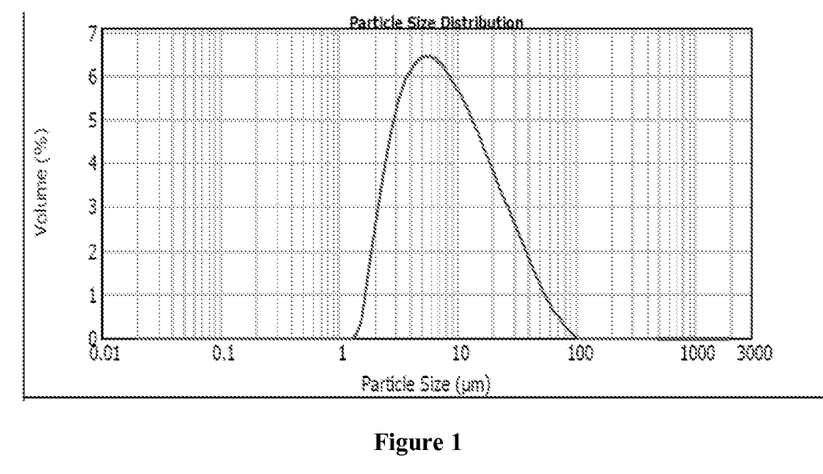
FIG. 1 shows effect of donor addition on Particle Size Distribution for example 4, which indicates higher amount of fines.
Figure 2:
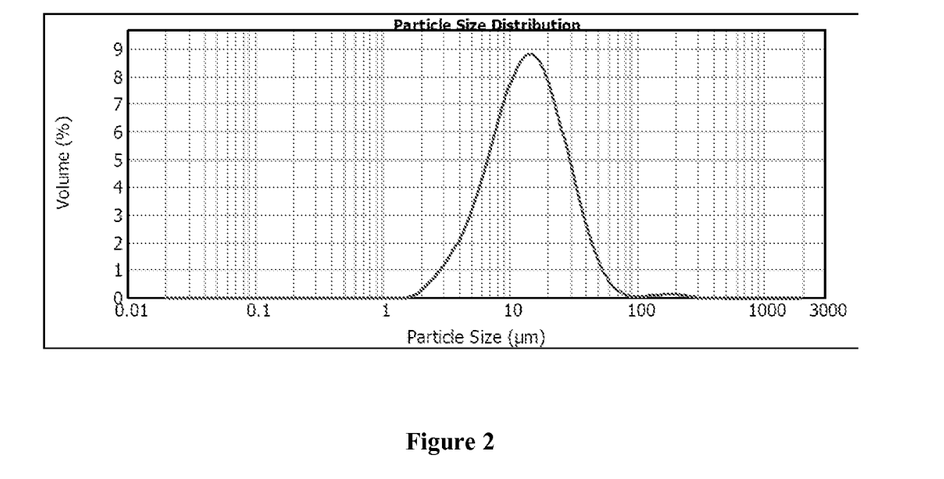
FIG. 2 shows effect of donor addition on Particle Size Distribution for example 8, which indicates lower amount of fines.
Figure 3:
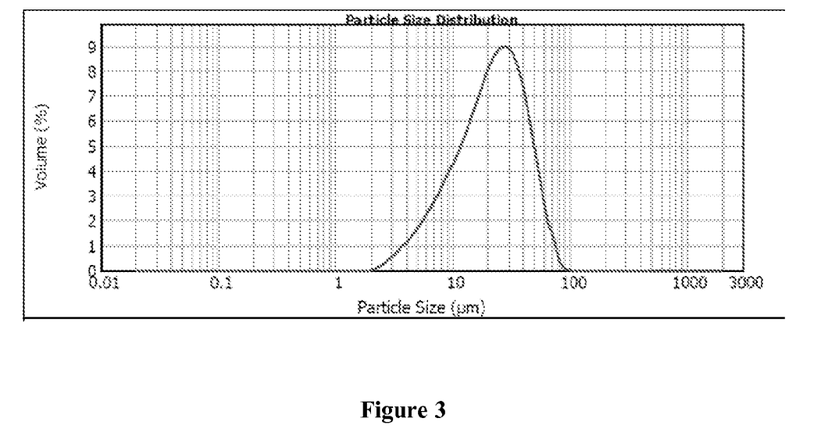
FIG. 3 shows effect of donor addition on Particle Size Distribution for example 9, which indicates lower amount of fines.
Figure 4:
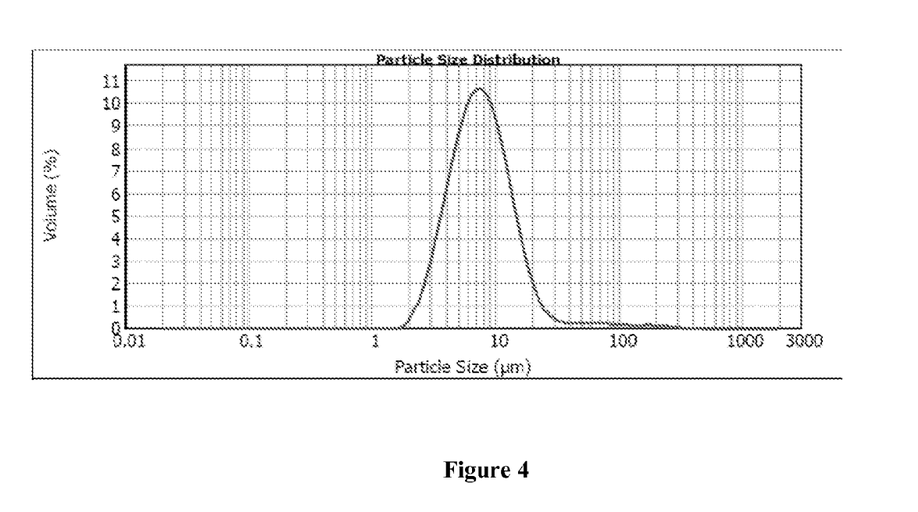
FIG. 4 shows effect of donor addition on Particle Size Distribution for example 10, which indicates narrow particle size distribution.

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The present invention describes a simple process for synthesis of a catalyst system, wherein the process involves fewer steps for polymerization of olefins having excellent activity and stereoregularity.

Further object of the present invention is to provide an improved method of producing catalyst component having desired chemical composition, morphology and surface properties. The process involves manipulations during the catalyst producing process involving contacting soluble magnesium component with titanium and addition of internal electron donor at any stage. The process of the present invention is simpler with lesser number of steps, economical and environment friendly. In addition, the process enhances the activity of the catalyst system while retaining the basic desired characteristics for the catalyst for polymerizing olefins.

A further object of the present invention is to provide a process of polymerizing and/or copolymerizing the olefin using the catalyst component produced through the process of the present invention.

The process for preparing the catalyst component of the present invention comprises:
(i) contacting magnesium based component with a compound having an ability to solubilize the magnesium compound
(ii) reacting this solubilized magnesium compound with titanium component
(iii) contacting the internal electron donor either after step (i) or as step (ii),
(iv) activating the above catalyst component with titanium component in an inert solvent,
(v) recovering the solid catalyst system through settling and decantation followed by washing with solvent.

Accordingly the present invention provides a process for preparation of a solid titanium catalyst component for use as pro-catalyst for a Ziegler-Natta catalyst system, said process comprising:

a. contacting a dialkyl magnesium compound represented by R'R"Mg with a magnesium solubilizing compound to form a reaction mixture, wherein each of R' and R" is a hydrocarbon group having $C_1$-$C_{20}$ carbon atoms, and wherein contacting the dialkyl magnesium compound with the magnesium solubilizing compound results in formation of first reaction mixture comprising magnesium alkoxide in the reaction mixture;

b. adding a titanium compound represented by $Ti(OR''')_p X_{4-p}$, where X is a halogen atom; R''' is a hydrocarbon group and p is an integer having value less than or equal to 4 to convert the magnesium alkoxide in the reaction mixture to form second reaction mixture;

c. adding at least one internal electron donor either after step (a) or after step (b) to obtain a catalyst component; and d. activating the catalyst component using a solution comprising a titanium compound and an inert solvent and recovering a solid titanium catalyst component.

In one embodiment of the present invention, the process for preparation of a solid titanium catalyst component includes late donor addition and the step comprises:

a. contacting a dialkyl magnesium compound represented by R'R"Mg with a magnesium solubilizing liquid alcohol represented by ROH to form a first reaction mixture comprising magnesium alkoxide, wherein contacting the dialkyl magnesium compound with the liquid alcohol results in the following reaction:

wherein each of R, R' and R" is a hydrocarbon group having $C_1$-$C_{20}$ carbon atoms;

b. adding a titanium compound represented by $Ti(OR''')_p X_{4-p}$, where X is a halogen atom; R''' is a hydrocarbon group and p is an integer having value less than or equal to 4 to the first reaction mixture to obtain a second reaction mixture comprising magnesium dihalide;

c. adding at least one internal electron donor to the second mixture to obtain a catalyst component; and d. activating the catalyst component using a solution comprising a titanium compound and an inert solvent and recovering a solid titanium catalyst component.

The process as discussed above, wherein step (a) comprises:

i. contacting dialkyl magnesium compound with liquid alcohol at a temperature maintained in the range of 2 to 8° C. to obtain a third reaction mixture; and ii. gradually increasing the temperature of the third reaction mixture to a value in the range of 50 to 70° C. and maintaining the temperature for a time period of about 15 to 45 minutes to form the first reaction mixture comprising magnesium alkoxide.

The process as discussed above, wherein step (b) comprises:

i. diluting the first reaction mixture with an inert solvent & cooling the same to a temperature in the range of −35 to −10° C.

ii. dissolving the titanium compound in a solvent to obtain a solution and cooling the solution; and iii. gradually mixing the solution thus obtained above in step (ii) with the diluted reaction mixture of step (i) at a temperature in the range of −35 to −10° C. to obtain the second reaction mixture.

The process as discussed above, wherein step (c) comprises:

i. gradually increasing the temperature of second reaction mixture to a value in the range of 25 to 50° C.;

ii. adding a source of internal electron donor;

iii. gradually increasing the temperature to a value in the range of 100 to 130° C. and maintaining the temperature for a time period of about 10 to 20 minutes to form the catalyst component; and iv. recovering the catalyst component thus formed.

The process as discussed above, wherein step (d) comprises:

i. treating the catalyst component with a solution comprising the titanium compound and an inert solvent and maintaining the same a temperature value in the range of 100 to 120° C. for about 10 to 20 minutes; and ii. optionally repeating the aforesaid step for a predetermined number of times.

In another embodiment of the present invention, the process for preparation of a solid titanium catalyst component includes early donor addition and the step comprises:

A. contacting a dialkyl magnesium compound represented by R'R"Mg with a liquid alcohol represented by ROH to form a first reaction mixture comprising magnesium alkoxide, wherein the contacting of the dialkyl magnesium compound with a liquid alcohol results in the following reaction:

wherein each of R, R' and R" is a hydrocarbon group;

B. adding at least one internal electron donor to the first reaction mixture to obtain a second reaction mixture;

C. adding a titanium compound represented by $Ti(OR''')_p X_{4-p}$, where X is a halogen atom; R''' is a hydrocarbon group and p is an integer having value less than or equal to 4 to the second reaction mixture of step (b) to obtain a catalyst component; and D. activating the catalyst component using a solution comprising a titanium compound and an inert solvent and recovering a solid titanium catalyst component.

The process as discussed above, wherein step (A) comprises:

i. contacting dialkyl magnesium compound with liquid alcohol at a temperature is maintained in the range of 2 to 8° C. to obtain a third reaction mixture; and ii. gradually increasing the temperature of the third reaction mixture to a value in the range of 50 to 70° C. and maintaining the temperature for a time period of about 15 to 45 minutes to form the first reaction mixture comprising magnesium alkoxide.

The process as discussed above, wherein step (B) comprises:

i. diluting the first reaction mixture with an inert solvent & cooling the same to a temperature in the range of −35 to −10° C.;

ii. adding a source of internal electron donor to the first reaction mixture to obtain the second reaction mixture.

The process as discussed above, wherein step (C) comprises:

i. dissolving the titanium compound in a solvent to obtain a solution and cooling the solution; and ii. gradually mixing the solution of step (i) with the second reaction mixture at a temperature in the range of −35 to −10° C. to obtain the catalyst component.

The process as discussed above, wherein step (D) comprises:
i. treating the catalyst component with a solution comprising the titanium compound and an inert solvent and maintaining the same a temperature value in the range of 100 to 120° C. for about 10 to 20 minutes; and
ii. optionally repeating step (i) for a predetermined number of times.

In yet another embodiment of the present invention, the inert solvent is selected from as group comprising of a chlorinated aromatic solvent, a non-chlorinated aromatic solvent, a chlorinated aliphatic solvent and a non-chlorinated aliphatic solvent.

In still an embodiment of the present invention, the inert solvent is selected from as group comprising of benzene, decane, kerosene, ethyl benzene, chlorobenzene, dichlorobenzene, toluene, o-chlorotoluene, xylene, dichloromethane, chloroform and cyclohexane.

In one embodiment of the present invention, a solid titanium catalyst component use as pro-catalyst for a Ziegler-Natta catalyst system comprises a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 μm, characterized by a three point particle size distribution of D10 in the range of 1 to 10 μm; D50 in the range of 5 to 25 μm and D90 in the range of 15 to 50 μm.

The present invention also provides a Ziegler-Natta catalyst system and the catalyst system comprises a combination of at least one organoaluminum compound, at least one external electron donor and a solid titanium catalyst component comprising a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 μm, characterized by a three point particle size distribution of D10 in the range of 1 to 10 μm; D50 in the range of 5 to 25 μm and D90 in the range of 15 to 50 μm.

In still an embodiment of the present invention, the external electron donor and the internal donor are same or different.

In yet another embodiment of the present invention, a ratio between titanium (from the solid titanium catalyst component):aluminum (from organoaluminum compound): external donor is in the range of 1:5-1000:0-250 and is preferably in the range of 1:25-500:25-100.

The present invention also provides a method of polymerizing and/or copolymerizing olefins, said method comprising the step of contacting an olefin having C2 to C20 carbon atoms under a polymerizing condition with a Ziegler-Natta catalyst system, said catalyst system comprising a combination of at least one organoaluminum compound, at least one external electron donor and a solid titanium catalyst component comprising a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 μm, characterized by a three point particle size distribution of D10 in the range of 1 to 10 μm; D50 in the range of 5 to 25 μm and D90 in the range of 15 to 50 μm.

In an embodiment, the process provides a solid catalyst component comprising of magnesium, titanium, halogen and internal electron donor which can be added at any stage using solubilized magnesium compound in an organic component as the starting material.

The magnesium component is selected from the group represented by dialkyl magnesium where alkyl group can be from $C_1$-$C_{20}$ which can either be same or different, for example dialkylmagnesium such as dimethylmagnesium, diethylmagnesium, diisopropylmagnesium, dibutylmagnesium, dihexylmagnesium, dioctylmagnesium, ethylbutylmagnesium, and butyloctylmagnesium. These magnesium compounds may be in the liquid or solid state.

The compound used to solubilize the magnesium compound according to the present invention is selected from the group belonging to liquid alcohol (ROH), aldehyde (RCHO), amine ($RNH_2$), carboxylic acid (RCOOH) or mixture thereof wherein R can be $C_1$-$C_{20}$ hydrocarbyl group.

In an embodiment, the organic compound having an ability to solubilize the magnesium compound is preferably liquid alcohol (ROH) including, no limited to, for example, aliphatic alcohols such as methanol, ethanol, propanol, butanol, 2-methylpentanol, 2-ethylbutanol, n-heptanol, n-octanol, 2-ethylhexanol, decanol and dodecanol, alicyclic alcohols such as cyclohexanol and methylcyclohexanol, aromatic alcohols such as benzyl alcohol and methylbenzyl alcohol, and aliphatic alcohols containing an alkoxy group, such as ethyl glycol, butyl glycol; aldehyde (RCHO) including, no limited to, for example, capric aldehyde and 2-ethylhexyl aldehyde; amine ($RNH_2$) including, no limited to, for example, heptyl amine, octyl amine, nonyl amine, lauryl amine and 2-ethylhexyl amine; carboxylic acid (RCOOH) including, no limited to, for example, caprylic acid and 2-ethylhexanoic acid or mixture thereof wherein R can be $C_1$-$C_{20}$ hydrocarbon group. The organic compound is preferably an alcohol, particularly preferably 2-ethylhexanol. These organic compounds may be used alone or in the form of mixture thereof.

The liquid titanium compound which is used in the preparation of the above mentioned catalyst component includes tetravalent titanium compound represented as $Ti(OR)_pX_{4-p}$ where X can be halogen selected from Cl or Br or I, R is a hydrocarbon group and p is an integer varying from 0-4. Specific examples of the titanium compound include, not limited to titanium tetrahalides such as titanium tetrachloride, titanium tetrabromide, titanium tetraiodide; alkoxytitanium trihalide such as methoxytitanium trichloride, ethoxytitanium trichloride, butoxytitanium trichloride, aryloxytitanium trihalide such as phenoxytitanium trichloride; dialkoxy titanium dihalides such as diethoxy titanium dichloride; trialkoxytitanium monohalide such as triethoxy titanium chloride; and tetraalkoxytitanium such as tetrabutoxy titanium, tetraethoxy titanium, and mixtures thereof, with titanium tetrachloride being preferred. These titanium compounds may be used alone or in the form of mixture thereof.

The solvent used in the present invention for contacting the solubilize magnesium compound with titanium compound includes chlorinated or non chlorinated aromatic or aliphatic in nature examples not limiting to benzene, decane, kerosene, ethyl benzene, chlorobenzene, dichlorobenzene, toluene, o-chlorotoluene, xylene, dichloromethane, chloroform, cyclohexane and the like.

The internal donor used according to the invention is selected from phthalates, benzoates, diethers, succinates, malonates, carbonates and combinations thereof. Specific examples include, but are not limited to di-n-butyl phthalate, di-i-butyl phthalate, di-2-ethylhexyl phthalate, methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate, diethyl succinate, di-propyl succinate, diisopropyl succinate, dibutyl succinate, diisobutyl succinate, diethyl malonate, diethyl ethylmalonate, diethyl propyl malonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl anisate, ethyl anisate and diether compounds such as 9,9-bis(methoxymethyl)fluorene, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

Further, the present invention describes a process for preparation of the solid catalyst component by contacting the solubilize magnesium component with liquid titanium compound and internal electron donor which can be added at any stage, in the presence of hydrocarbon solvent. In one embodiment, the first step of the process involves the reaction of magnesium compound which is preferably dialkyl magnesium with organic compound which is preferably alcohol specifically higher alcohol. The advantage of using higher alcohol improves the solubilization of magnesium component and hence affects the disorderment in the $MgCl_2$ lattice during its formation. The resulting particle size and morphology is also closely related. It is also possible to contact the magnesium compound with a similar alcohol or with a mixture of alcohols. However the quantity of alcohol depends upon the quantity of magnesium compound used and also that the resultant complex should be in solubilizes form.

According to the preferred embodiment, the magnesium compound is reacted with the said alcohol ROH in a molar ratio Mg/ROH of between 1:5 to 1:0.5, preferably between about 1:4 to 1:1. For example, if the usage of alcohol is too little then the magnesium compound in liquid phase will have no homogeneity while usage of too much of alcohol will be economically disadvantageous. In another embodiment of the present invention, formation of homogeneous solution of magnesium component in alcohol is desirable. For attaining this, the magnesium and the alcohol compound are contacted at temperature preferably between about 0° C. and about 20° C., and more preferably between about 2° C. and about 10° C. Usually, the contact time is for about 0.5 to 2 h.

The present invention describes a process for preparation of the solid catalyst component by contacting the solubilize magnesium component with liquid titanium compound and internal electron donor which can be added at any stage, in the presence of hydrocarbon solvent. In an embodiment, the liquid titanium compound is contacted with the solution wherein the magnesium compound has been solubilized. In another embodiment, the solution containing the magnesium component is contacted with the liquid titanium compound. It is believed that liquid titanium compound helps in the formation of amorphous $MgCl_2$ as it acts as halogenating agent as well as is dispersed and supported on the catalyst surface. Moreover, the removal of alcohol from the solution, results in the precipitation of the solid component, having especially desired surface properties and particle shape. More important, the particles are uniform in shape.

In an embodiment, the titanium compound is added in amounts ranging from usually about at least 1 to 200 moles, preferably, 3 to 200 moles and more preferably, 5 mole to 100 moles, with respect to one mole of magnesium. Further, before the liquid titanium compound is contacted with the solubilized magnesium component, the magnesium component is diluted with a solvent which reduces the viscosity of the solution. In a preferred embodiment, as a solvent, various hydrocarbons which can be chlorinated or non chlorinated aromatic or aliphatic in nature examples not limiting to benzene, decane, kerosene, ethyl benzene, chlorobenzene, dichlorobenzene, toluene, o-chlorotoluene, xylene, dichloromethane, chloroform, cyclohexane and the like can be used, preferably chlorobenzene.

In an embodiment, before the liquid titanium compound is contacted with the solubilized diluted magnesium component, the magnesium component is cooled to temperature preferably between about −50° C. and about 0° C., and more preferably between about −30° C. and about −10° C.

In an embodiment, the liquid titanium compound may be contacted neat or may be dissolved in solvent which includes but not limiting to benzene, decane, kerosene, ethyl benzene, chlorobenzene, dichlorobenzene, toluene, o-chlorotoluene, xylene, dichloromethane, chloroform, cyclohexane and the like, preferably chlorobenzene comprising from 40 to 60 volume percent and cooled to temperature preferably between about −50° C. and about 0° C., and more preferably between about −30° C. and about −10° C. with the solubilized magnesium component.

According to an embodiment of the present invention, the contact procedure for titanium and magnesium component is slow with drop wise addition at desired temperature, followed by heating to activate the reaction between both the components. In a preferred embodiment, this reaction system is gradually heated to the temperature effective to carry out the reaction, preferably about 30° C. and about 80° C., and more preferably about 40° C. and about 60° C., and heating is instigated at a rate of 0.1 to 10.0° C./minute, or at a rate of 1 to 5.0° C./minute. The resultant is the solid component in the solvent comprising of magnesium, titanium, alcohol and halogen components.

The present invention describes a process for preparation of the solid catalyst component by contacting the solubilized magnesium component with liquid titanium compound and internal electron donor in the presence of hydrocarbon solvent. In one embodiment, the internal electron donor is added either to the same reaction mixture without isolating or recovering the solid component comprising of magnesium, titanium, alcohol and halogen or to the solubilize magnesium component, at temperature preferably between about −30° C. and about 120° C., and more preferably between about −25° C. and about 95° C. preferably to the solubilize magnesium component.

The "internal electron donor" is a compound that is added during the formation of catalyst composition where it is acting as Lewis base i.e. donating the electron pairs to the metal present in the catalyst composition. Not bounded by any particular theory, it is stated in literature that internal electron donor stabilizes the primary crystallites of magnesium dihalide which is generated in situ. Apart from this, the internal donor also being better Lewis base have preferred coordination with the higher acidity coordination sites on magnesium dihalide matrix which in turn avoid the coordination of titanium and hence prevents the formation of inactive sites. They also increase the activity of low active sites. This in all enhances the catalyst stereoselectivity. All internal electron donor compounds commonly used in the art can be used in the present invention. In another embodiment of the invention, the internal electron donor is used in an amount of from 0 to 1 moles, preferably from 0.01 to 0.5 moles, with respect to one mole of magnesium. The contact time of the solid component with the internal electron donor is at least 10 minutes to 60 minutes at a temperature from at least about 25° C. to about 150° C., preferably from about 25° C. to about 110° C.

The procedure of contacting the titanium component may be repeated one, two, three or more times as desired. In an embodiment, the resulting solid material recovered from the mixture can be contacted one or more times with the mixture of liquid titanium component in solvent for at least 10 minutes up to 60 minutes, at temperature from about 25° C. to about 150° C., preferably from about 25° C. to about 110° C.

The resulting solid component comprising of magnesium, titanium, halogen, alcohol and the internal electron donor can be separated from the reaction mixture either by filtration or decantation and finally washed with inert solvent to remove unreacted titanium component and other side products. Usually, the resultant solid material is washed one or more times with inert solvent which is typically a hydrocarbon including, not limiting to aliphatic hydrocarbon like isopentane, isooctane, hexane, pentane or isohexane. In an embodiment, the resulting solid mixture is washed one or more times with inert hydrocarbon based solvent preferably, hexane at temperature from about 25° C. to about 70° C., preferably from about 25° C. to about 60° C. The solid catalyst then can be separated and dried or slurried in a hydrocarbon specifically heavy hydrocarbon such as mineral oil for further storage or use.

In an embodiment, the catalyst composition includes from about 5.0 wt % to 20 wt % of internal electron donor, titanium is from about 1.0 wt % to 6.0 wt % and magnesium is from about 15 wt % to 20 wt %. The surface area measured by the BET method of the resultant solid catalyst component is preferably between 80 and 400 m$^2$/g, more preferably between 200 and 300 m$^2$/g. The pore volume measured by BET method is between 0.1 and 0.5, preferably between 0.2 to 0.4 ml/g.

In an embodiment, the method of polymerization process is provided where the catalyst system is contacted with olefin under polymerization conditions. The catalyst system includes catalyst component, organoaluminum compounds and external electron donors. The olefins includes from C2-C20. The ratio of titanium (from catalyst composition):aluminum (from organoaluminum compound):external donor can be from 1:5-1000:0-250, preferably in the range from 1:25-500:25-100.

The present invention provides the catalyst system wherein the catalyst system includes the catalyst component, organoaluminum compounds and external electron donors. In an embodiment, the organoaluminum compounds include, not limiting, alkylaluminums such as trialkylaluminum such as preferably triethylaluminum, triisopropylaluminum, triisobutylaluminum, tri-n-butylaluminum, tri-n-hexylaluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide.

The mole ratio of aluminum to titanium is from about 5:1 to about 1000:1 or from about 10:1 to about 700:1, or from about 25:1 to about 500:1.

The present invention provides the catalyst system. The catalyst system includes catalyst component, organoaluminum compounds and external electron donors. The external electron donors are organosilicon compounds, diethers and alkoxy benzoates. The external electron donor for olefin polymerization when added to the catalytic system as a part of cocatalyst retains the stereospecificity of the active sites, convert non-stereospecific sites to stereospecific sites, poisons the non-stereospecific sites and also controls the molecular weight distributions while retaining high performance with respect to catalytic activity. The external electron donors which are generally organosilicon compounds includes but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane, cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butyl-cyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, diindenylcyclopentylmethoxysilane and ethylenebis-cyclopentyldimethoxysilane; aminosilanes such as aminopropyltriethoxysilane, n-(3-triethoxysilylpropyl)amine, bis[(3-triethoxysilyl)propyl]amine, aminopropyltrimethoxysilane, aminopropylmethyldiethoxysilane, hexanediaminopropyltrimethoxysilane.

In an embodiment, the external electron donor, other than organosilicon compounds include, but not limited to amine, diether, esters, carboxylate, ketone, amide, phosphine, carbamate, phosphate, sulfonate, sulfone and/or sulphoxide.

The external electron donor is used in such an amount to give a molar ratio of organoaluminum compound to the said external donor from about 0.1 to 500, preferably from 1 to 300.

In the present invention, the polymerization of olefins is carried out in the presence of the catalyst system described above. The catalyst system is contacted with olefin under polymerization conditions to produce desired polymer products. The polymerization process can be carried out such as slurry polymerization using as diluent which is an inert hydrocarbon solvent, or bulk polymerization using the liquid monomer as a reaction medium and in gas-phase operating in one or more fluidized or mechanically agitated bed reactors. In an embodiment, polymerization is carried out as such. In another embodiment, the copolymerization is carried out using at least two polymerization zones.

The catalyst of the present invention can be used in the polymerization of the above-defined olefin $CH_2=CHR$, the examples of said olefin include ethylene, propylene, 1-butene, 4-methyl-1-pentene, 1-hexene, and 1-octene. In particular, said catalyst can be used to produce, such as, the following products: high-density polyethylene (HDPE, having a density higher than 0.940 $g/cm^3$), which includes ethylene homopolymer and copolymer of ethylene and α-olefins having 3 to 12 carbon atoms; linear low-density polyethylene (LLDPE, having a density lower than 0.940 $g/cm^3$), and very low density and ultra low density polyethylene (VLDPE and ULDPE, having a density lower than 0.920 $g/cm^3$, and as low as 0.880 $g/cm^3$), consisting of the copolymer of ethylene and one or more α-olefins having 3 to 12 carbon atoms, wherein the molar content of the unit derived from ethylene is higher than 80%; elastomeric copolymer of ethylene and propylene, and elastomeric terpolymers of ethylene and propylene as well as diolefins at a small ratio, wherein the weight content of the unit derived from ethylene is between about 30% and 70%; isotactic polypropylene and crystalline copolymer of propylene and ethylene and/or other α-olefins, wherein the content of the unit derived from propylene is higher than 85% by weight (random copolymer); impact propylene polymer, which are produced by sequential polymerization of propylene and the mixture of propylene and ethylene, with the content of ethylene being up to 40% by weight; copolymer of propylene and 1-butene, containing a great amount, such as from 10 to 40 percent by weight, of unit derived from 1-butene. It is especially significant that the propylene polymers produced by using the catalysts of the invention show very broad molecule weight distribution (MWD) and have very high isotactic index.

The polymerization is carried out at a temperature from 20 to 120° C., preferably from 40 to 80° C. When the polymerization is carried out in gas phase, operation pressure is usually in the range of from 5 to 100 bar preferably from 10 to 50 bar. The operation pressure in bulk polymerization is usually in the range of from 10 to 150 bar, preferably from 15 to 50 bar. The operation pressure in slurry polymerization is usually in the range of from 1 to 10 bar, preferably from 2 to 7 bar. Hydrogen can be used to control the molecular weight of polymers.

In the present invention, the polymerization of olefins is carried out in the presence of the catalyst system described above. The described catalyst system can be directly added to the reactor for polymerization or can be prepolymerized i.e catalyst is subjected to a polymerization at lower conversion extent before being added to polymerization reactor. Prepolymerization can be performed with olefins preferably ethylene and/or propylene where the conversion is controlled in the range from 0.2 to 500 gram polymer per gram catalyst.

In the present invention, the polymerization of olefins in presence of the described catalyst system leads to the formation of polyolefins having xylene soluble (XS) from about 0.2% to about 15%. In another embodiment, polyolefins having xylene soluble (XS) from about 2% to about 8%. Here XS refers to the weight percent of polymer that get dissolves into hot xylene generally for measuring the tacticity index such as highly isotactic polymer will have low XS % value i.e. higher crystallinity, whereas low isotactic polymer will have high XS % value.

The present invention provides the catalyst system wherein the catalyst efficiency (measured as kilogram of polymer produced per gram of catalyst) is at least about 30. In another embodiment, the catalyst efficiency of the described catalyst system is at least about 60.

According to the invention, the catalysts system when used for polymerizing olefins provides polyolefins having melt flow indexes (MFI) from about 0.1 to about 100 which is measured according to ASTM standard D1238. In an embodiment, polyolefins having MFI from about 5 to about 30 are produced.

According to the invention, the catalysts system when used for polymerizing olefins provides polyolefins having bulk densities (BD) of at least about 0.3 cc/g.

The following examples are illustrative of the invention but not to be construed to limit the scope of the present invention.

Examples 1-15

Synthesis of the Soluble Magnesium Adduct

In 250 ml glass reactor maintained at 5° C., 20.6 ml of BOMAG added under slow stirring and temperature was maintained for 20 minutes. 6.0 ml of 2-ethylhexanol (EHA) was slowly added over ~60 min interval and highly exothermic reaction was observed. During the addition of EHA, the temperature was maintained at 5° C.±3 and the system was kept at 5° C. for further 10 minutes. Further, the temperature was increased to 60° C. for 30 minutes. The resulting solution was thick and transparent in nature.

Preparation of the Catalyst Component

Early Donor Addition:
To the solution of magnesium adduct cooled to −20° C., added 15 ml chlorobenzene and 1 ml DIBP. In another 250 ml reactor, cooled to −25° C., 30 ml $TiCl_4$ and 15 ml chlorobenzene added to the reactor and stirred. After the system has attained −25° C., solution of magnesium adduct and DIBP was added drop-wise to $TiCl_4$/chlorobenenze mixture over 1 h and reaction temperature maintained at −25° C. The resultant solution was clear orange in color. After the complete addition, the temperature was maintained at −25° C. and then gradually increased to 40° C. Then the temperature was increased to 110° C. where it was kept for 1 h. After settling and decantation, the suspended solid was again treated with 30 ml TiCl$_4$ and 30 ml chlorobenzene and after temperature reached 110° C., the mixture was maintained under stirring for 15 minutes. The above step was again repeated. After the reaction was finished, the solid was decanted and washed sufficiently with heptane followed by hexane at 95° C. and 70° C., respectively and further dried under hot nitrogen till freely flowing.

Late Donor Addition:

To the solution of magnesium adduct cooled to −20° C., added 15 ml chlorobenzene. In another 250 ml reactor, cooled to −25° C., 30 ml TiCl$_4$ and 15 ml chlorobenzene added to the reactor and stirred. After the system has attained −25° C., solution of magnesium adduct was added drop-wise to TiCl$_4$/chlorobenenze mixture over 1 h and reaction temperature maintained at −25° C. The resultant solution was clear orange in color. After the complete addition, the temperature was maintained at −25° C. and then gradually increased to 40° C. 1 ml DIBP was added and then maintained for 10 min within which the solution turned yellow and turbid. Then the temperature was increased to 110° C. where it was kept for 1 h. After settling and decantation, the suspended solid was again treated with 30 ml TiCl$_4$ and 30 ml chlorobenzene and after temperature reached 110° C., the mixture was maintained under stirring for 15 minutes. The above step was again repeated. After the reaction was finished, the solid was decanted and washed sufficiently with heptane followed by hexane at 95° C. and 70° C., respectively and further dried under hot nitrogen till freely flowing. The solid catalysts composition synthesized by the above procedure has been tabulated in Table 1.

TABLE 1

| Catalyst | Mg/Ti Mol ratio | Mg/ID Mol ratio | Ti (wt %) | Mg (wt %) | ID (wt %) | Remarks |
| --- | --- | --- | --- | --- | --- | --- |
| Example 1 | 15 | 0.21 | 9.5 | 9.6 | 19.2 | Late ID addition ID addition to TiCl$_4$/solubilize Mg at 40° C. |
| Example 2 | 15 | 0.21 | 2.6 | 17.1 | 11.4 | Late ID addition ID addition to TiCl$_4$/solubilize Mg at 40° C. |
| Example 3 | 15 | 0.21 | 2.9 | 17.1 | 16.4 | Late ID addition ID addition to TiCl$_4$/solubilize Mg at 40° C. |
| Example 4 | 15 | 0.21 | 2.8 | 17.1 | 23.1 | Late ID addition ID addition to TiCl$_4$/solubilize Mg at 40° C. |
| Example 5 | 15 | 0.21 | 3.5 | 15.8 | 23.2 | Late ID addition ID addition to TiCl$_4$/solubilize Mg at 20° C. |
| Example 6 | 15 | 0.21 | 2.4 | 17.6 | 13.7 | Early ID addition ID addition to solubilize Mg at −20° C. |
| Example 7 | 30 | 0.21 | 3.5 | 15.4 | 10.3 | Late ID addition ID addition to TiCl$_4$/solubilize Mg at 40° C. |
| Example 8 | 15 | 0.21 | 2.5 | 20.8 | 18.9 | Early ID addition ID addition to solubilize Mg at −20° C. |
| Example 9 | 15 | 0.15 | 3.0 | 17.7 | 22.6 | Early ID addition ID addition to solubilize Mg at −20° C. |
| Example 10 | 15 | 0.08 | 3.5 | 17.2 | 13.6 | Early ID addition ID addition to solubilize Mg at −20° C. |
| Example 11 | 15 | 0.15 | 2.8 | 16.9 | 20.9 | Early ID addition ID addition to solubilize Mg at −20° C. |
| Example 12 | 15 | 0.15 | 2.8 | 17.7 | 26.8 | Early ID addition ID addition to solubilize Mg at −20° C. |
| Example 13 | 15 | 0.21 | 5.1 | 17.5 | 12.9 | 2-ethyl-1-hexylamine as solubilizing agent Early ID addition ID addition to solubilize Mg at −20° C. |
| Example 14 | 15 | 0.21 | 2.5 | 17.4 | 15.2 | 2-ethyl-1-hexanal as solubilizing agent Early ID addition ID addition to solubilize Mg at −20° C. |
| Example 15 | 15 | 0.21 | 3.1 | 17.8 | 14.2 | 2-ethyl-1-hexanoic acid as solubilizing agent Early ID addition ID addition to solubilize Mg at −20° C. |

The Table 1 indicates that catalyst composition especially with respect to titanium incorporation remains stable irrespective of donor addition methodology.

Effect of donor addition on catalyst particle size distribution is tabulated in Table 2.

TABLE 2

| S. No. | Expt No. | Conditions | D10 | D50 | D90 | Span (D90-D10)/D50 | Remarks |
|---|---|---|---|---|---|---|---|
| 1. | Example 4 | Late Donor Addition Mg/ID (mol ratio) = 0.21 | 2 | 7 | 28 | 3.7 | Higher amount of fines |
| 2. | Example 8 | Early Donor Addition Mg/ID (mol ratio) = 0.21 | 5 | 14 | 32 | 1.9 | Lower amount of fines |
| 3. | Example 9 | Early Donor Addition Mg/ID (mol ratio) = 0.15 | 8 | 22 | 47 | 1.8 | Lower amount of fines |
| 4. | Example 10 | Early Donor Addition Mg/ID (mol ratio) = 0.08 | 4 | 8 | 16 | 1.5 | Narrow Particle Size Distribution |

The Table 2 indicates that with respect to late donor addition, the span (indicating broadness of particle size distribution) for early donor addition is much lower thereby catalyst particles are having narrower PSD/higher uniformity.

Bulk Polymerization of Propylene

The polymerization was carried out in a stirred reactor using liquid propylene. After conditioning of the reactor, required amount of triethylaluminum, external donor were charged in and allowed to contact for 5 min. 0.6 bar of hydrogen and 1000 ml of propylene were charged in the reactor and the temperature was set to 70° C. After the desired time, the polymerization was stopped and final polymer was retrieved from the reactor and further analyzed. Catalyst performance and polymer properties has been tabulated in Table 3.

TABLE 3

| Cat | Cat amt mg | Donor | Al/donor mol/mol | Al/Ti mol/mol | H2 barg | Activity kg PP/g cat | MFR (Rheo) 230° C./ 2.16 kg | BD kg/dm$^3$ | XS wt % | $M_w$ ×10$^5$ | $M_n$ ×10$^4$ | Tm ° C. |
|---|---|---|---|---|---|---|---|---|---|---|---|---|
| Ex 2 | 18 | D-donor | 21 | 270 | 2.3 | 67 | 29-36 | | 1.2 | | | |
| Ex 2 | 7 | D-donor | 21 | 340 | 2.1 | 59 | 26 | | 1.3 | | | |
| Ex 2 | 7 | D-donor | 21 | 340 | 0.6 | 31 | 5.6 | 0.31 | 1.2 | | | |
| Ex 2 | 18 | D-donor | 21 | 230 | 0.4 | 31 | 14 | | 2.6 | | | |
| Ex 3 | 9 | D-donor | 21 | 240 | 0.6 | 32 | 5.7 | 0.38 | 1.6 | | | |
| Ex 3 | 9 | D-donor | 21 | 240 | 0.6 | 50 | 7.5 | | 1.9 | | | |
| Ex 4 | 9 | D-donor | 20 | 250 | 0.4 | 66 | 5.1 | | 1.8 | | | |
| Ex 4 | 9 | D-donor | 20 | 250 | 0.5 | 52 | 5.7 | 0.38 | 1.7 | | | |
| Ex 5 | 18 | C-donor | 20 | 250 | 0.5 | 33 | 12 | 0.34 | | 2.5 | 7.2 | |
| Ex 6 | 10 | C-donor | 20 | 260 | 0.3 | 54 | 12 | 0.32 | 2.7 | 2.6 | 7.0 | 160.8 |
| Ex 7 | 10 | C-donor | 20 | 250 | 0.2 | 30 | 5.5 | 0.40 | 3.3 | 2.9 | 8.3 | 160.5 |
| Ex 5 | 10 | C-donor | 20 | 250 | 0.2 | 22 | 8.6 | 0.32 | 2.8 | 2.5 | 7.4 | 161.0 |
| Ex 8 | 10 | C-donor | 20 | 250 | 0.2 | 41 | 3.3 | 0.36 | 2.8 | 3.2 | 9.4 | 161.2 |
| Ex 9 | 10 | C-donor | 20 | 250 | 0.2 | 38 | 4.3 | 0.34 | 3.5 | 2.9 | 8.8 | 159.9 |
| Ex 10 | 10 | C-donor | 20 | 240 | 0.2 | 33 | 3.9 | 0.36 | 4.5 | 2.8 | 7.8 | 159.6 |
| Ex 11 | 10 | C-donor | 20 | 260 | 0.2 | 36 | 6.4 | 0.36 | 3.7 | 2.5 | 7.0 | 159.4 |
| Ex 12 | 10 | C-donor | 20 | 260 | 0.3 | 35 | 9 | 0.29 | 5.7 | 2.4 | 5.8 | 159.0 |
| Ex 12 | 10 | D-donor | 10 | 260 | 0.5 | 35 | 4.2 | 0.31 | 3.0 | 3.1 | 6.5 | 163.0 |
| Ex 9 | 10 | D-donor | 5 | 250 | 0.6 | 33 | 4.3 | 0.34 | 1.7 | 3.0 | 7.2 | 163.4 |
| Ex 13* | 10 | C-donor | 30 | 500 | 1 | 7.8 | 5.6 | 0.32 | 5.0 | | | 163.1 |
| Ex 14* | 10 | C-donor | 30 | 500 | 1 | 6.5 | 4.5 | 0.34 | 4.2 | | | 161.2 |
| Ex 15* | 10 | C-donor | 30 | 500 | 1 | 7.4 | 5.2 | 0.35 | 4.6 | | | 161.0 |

*Slurry polymerization in n-hexane

The Table 3 indicates that all the catalysts are found to be active for propylene polymerization with good hydrogen and external donor response.

Catalyst performance for random copolymerization and polymer properties has been tabulated in Table 4.

TABLE 4

| Cat | Cat amt mg | Al/D-donor mol/mol | Al/Ti mol/mol | H2 barg | Activity kg PP/g cat*h | C2 Content Wt % | MFR, (Rheo) 230° C./ 2.16 kg | XS wt % | $M_w$ ×10$^5$ | $M_n$ ×10$^4$ | Tm ° C. |
|---|---|---|---|---|---|---|---|---|---|---|---|
| Ex 9 | 9 | 5 | 275 | 0.5 | 33 | 8 | 3.3 | 26 | 3.3 | 1.3 | 121.1 |
| Ex 9 | 10 | 5 | 248 | 0.4 | 38 | 3.5 | 3.4 | 5 | 3.4 | 9.5 | 142.5 |
| Ex 9 | 9 | 5 | 275 | 0.5 | 37 | 5.3 | 3.7 | 9 | 3.2 | 9.1 | 133.6 |

The Table 4 indicates that the catalyst where early donor addition methodology was used was found to be providing good comonomer incorporation as high as 8 wt % without stickiness.

Catalyst performance for synthesizing Impact copolymers and polymer properties has been tabulated in Table 5.

TABLE 5

| | | S. No. | | | | | |
|---|---|---|---|---|---|---|---|
| | | 1 | | 2 | | 3 | |
| Cat | | Ex 9 | Ex 9 | Ex 9 | Ex 9 | Ex 9 | Ex 9 |
| Catalyst amount | mg | 9 | | 8 | | 10 | |
| Al/donor | mol/mol | 5 | | 5 | | 5 | |
| Al/Ti | mol/mol | 275 | | 330 | | 248 | |
| Polymerization | | HOMO | HECO | HOMO | HECO | HOMO | HECO |
| H2 | barg | 0.5 | 0 | 0.6 | 0 | 0.5 | 0.6 |
| Comonomer type | | | C2 | | C2 | | C2 |
| Comonomer feed | | | C2/C3 40/60 mol % | | C2/C3 30/70 mol % | | C2/C3 30/70 mol % |
| Reactor split | wt % | 63 | 37 | 50 | 50 | 58 | 42 |
| Activity | kg PP/g cat*h | 37.1 | 30.7 | 40.0 | 6.3 | 47.5 | 12.0 |
| MFR, (Rheo) | 230° C./2.16 kg | | 0.18 | | 0.07 | | 2.2 |
| C2 Content | wt % | | 14.6 | | 10.8 | | 11.4 |
| XS | wt % | | 29 | | 37 | | 46.6 |
| $M_w$ | ×10$^5$ | | 6.8 | | 7.0 | | 3.4 |
| $M_n$ | ×10$^4$ | | 11.1 | | 11.0 | | 9.0 |
| Tm | ° C. | | 163 | | 163 | | 163 |

The Table 5 indicates that the catalyst where early donor addition methodology was used was found to be providing good comonomer incorporation as high as 14 wt % without stickiness.

We claim:

1. A process for preparation of a solid titanium catalyst component for use as pro-catalyst for a Ziegler-Natta catalyst system, said process consisting essentially of:
   (a) contacting a dialkyl magnesium compound represented by R'R"Mg with a magnesium solubilizing compound to form a reaction mixture, wherein each of R' and R" is a hydrocarbon group having $C_1$-$C_{20}$ carbon atoms, and wherein contacting the dialkyl magnesium compound with the magnesium solubilizing compound results in formation of first reaction mixture comprising magnesium alkoxide in the reaction mixture;
   (b) adding a titanium compound represented by Ti(OR''')$_p$X$_{4-p}$, where X is a halogen atom; R''' is a hydrocarbon group and p is an integer having value less than or equal to 4 to convert the magnesium alkoxide in the reaction mixture to form second reaction mixture;
   (c) adding at least one internal electron donor either after step (a) or after step (b) to obtain a catalyst component; and
   (d) activating the catalyst component using a solution comprising a titanium compound and an inert solvent and recovering a solid titanium catalyst component.

2. The process as claimed in claim 1, wherein the magnesium solubilizing compound is liquid alcohol represented by ROH, wherein R is a hydrocarbon group having $C_1$-$C_{20}$ carbon atoms; and wherein:
   a. liquid alcohol is selected from the group consisting of aliphatic alcohol, alicyclic alcohol, aromatic alcohol, aliphatic alcohol containing an alkoxy group and mixture thereof.

3. The process as claimed in claim 1, comprising:
   (a) contacting a dialkyl magnesium compound represented by R'R"Mg with a magnesium solubilizing liquid alcohol represented by ROH to form a first reaction mixture comprising magnesium alkoxide, wherein contacting the dialkyl magnesium compound with the liquid alcohol results in the following reaction:

R'R"Mg+2ROH→Mg(OR)$_2$+R'H+R"H wherein each of R, R' and R" is a hydrocarbon group having $C_1$-$C_{20}$ carbon atoms;
   (b) adding a titanium compound represented by Ti(OR''')$_p$X$_{4-p}$, where X is a halogen atom; R''' is a hydrocarbon group and p is an integer having value less than or equal to 4 to the first reaction mixture to obtain a second reaction mixture comprising magnesium dihalide;
   (c) adding at least one internal electron donor to the second mixture to obtain a catalyst component; and
   (d) activating the catalyst component using a solution comprising a titanium compound and an inert solvent and recovering a solid titanium catalyst component.

4. The process as claimed in claim 3, wherein step (a) comprises:
   i. contacting dialkyl magnesium compound with liquid alcohol at a temperature maintained in the range of 2 to 8° C. to obtain a third reaction mixture; and
   ii. gradually increasing the temperature of the third reaction mixture to a value in the range of 50 to 70° C. and maintaining the temperature for a time period of 15 to 45 minutes to form the first reaction mixture comprising magnesium alkoxide.

5. The process as claimed in claim 3, wherein step (b) comprises:
   i. diluting the first reaction mixture with an inert solvent & cooling the same to a temperature in the range of −35 to −10° C.;
   ii. dissolving the titanium compound in a solvent to obtain a solution and cooling the solution; and
   iii. gradually mixing the solution thus obtained above in step (ii) with the diluted reaction mixture of step (i) at a temperature in the range of −35 to −10° C. to obtain the second reaction mixture.

6. The process as claimed in claim 3, wherein step (c) comprises:
   i. gradually increasing the temperature of second reaction mixture to a value in the range of 25 to 50° C.;
   ii. adding a source of internal electron donor;
   iii. gradually increasing the temperature to a value in the range of 100 to 130° C. and maintaining the temperature for a time period of 10 to 20 minutes to form the catalyst component; and
   iv. recovering the catalyst component thus formed.

7. The process as claimed in claim 3, wherein step (d) comprises:
   i. treating the catalyst component with a solution comprising the titanium compound and an inert solvent and maintaining the same a temperature value in the range of 100 to 120° C. for 10 to 20 minutes; and
   ii. optionally repeating the aforesaid step for a predetermined number of times.

8. The process as claimed in claim 1, comprising
   A. contacting a dialkyl magnesium compound represented by R'R"Mg with a liquid alcohol represented by ROH to form a first reaction mixture comprising magnesium alkoxide, wherein the contacting of the dialkyl magnesium compound with a liquid alcohol results in the following reaction:

wherein each of R, R' and R" is a hydrocarbon group;
   B. adding at least one internal electron donor to the first reaction mixture to obtain a second reaction mixture;
   C. adding a titanium compound represented by $Ti(OR''')_p X_{4-p}$, where X is a halogen atom; R''' is a hydrocarbon group and p is an integer having value less than or equal to 4 to the second reaction mixture of step (b) to obtain a catalyst component; and
   D. activating the catalyst component using a solution comprising a titanium compound and an inert solvent and recovering a solid titanium catalyst component.

9. The process as claimed in claim 8, wherein step (A) comprises:
   i. contacting dialkyl magnesium compound with liquid alcohol at a temperature is maintained in the range of 2 to 8° C. to obtain a third reaction mixture; and
   ii. gradually increasing the temperature of the third reaction mixture to a value in the range of 50 to 70° C. and maintaining the temperature for a time period of 15 to 45 minutes to form the first reaction mixture comprising magnesium alkoxide.

10. The process as claimed in claim 8, wherein step (B) comprises:
    i. diluting the first reaction mixture with an inert solvent & cooling the same to a temperature in the range of −35 to −10° C.;
    ii. adding a source of internal electron donor to the first reaction mixture to obtain the second reaction mixture.

11. The process as claimed in claim 8, wherein step (C) comprises:
    i. dissolving the titanium compound in a solvent to obtain a solution and cooling the solution; and
    ii. gradually mixing the solution of step (i) with the second reaction mixture at a temperature in the range of −35 to −10° C. to obtain the catalyst component.

12. The process as claimed in claim 8, wherein step (D) comprises:
    i. treating the catalyst component with a solution comprising the titanium compound and an inert solvent and maintaining the same a temperature value in the range of 100 to 120° C. for 10 to 20 minutes; and
    ii. optionally repeating step (i) for a predetermined number of times.

13. The process as claimed in claim 1, wherein the dialkyl magnesium compound is selected from the group consisting of dialkylmagnesium such as dimethylmagnesium, diethylmagnesium, diisopropylmagnesium, dibutylmagnesium, dihexylmagnesium, dioctylmagnesium, ethylbutylmagnesium and butyloctylmagnesium.

14. The process as claimed in claim 2, wherein the liquid alcohol is selected from the group consisting of aliphatic alcohol, alicyclic alcohol, aromatic alcohol, aliphatic alcohol containing an alkoxy group and mixture thereof; wherein:
    the aliphatic alcohol is selected from the group consisting of methanol, ethanol, propanol, butanol, 2-methylpentanol, 2-ethylbutanol, n-heptanol, n-octanol, 2-ethylhexanol, decanol and dodecanol,
    alicyclic alcohols is selected from the group consisting of cyclohexanol and methylcyclohexanol;
    aromatic alcohol is selected from the group consisting of benzyl alcohol and methylbenzyl alcohol; and
    aliphatic alcohol containing an alkoxy group is selected from the group consisting of ethyl glycol and butyl glycol.

15. The process as claimed in claim 14, wherein the liquid alcohol is 2-ethylhexanol.

16. The process as claimed in claim 1, wherein the titanium compound represented by $Ti(OR''')_p X_{4-p}$ is selected from the group consisting of titanium tetrahalide, alkoxytitanium trihalide, dialkoxy titanium dihalide, trialkoxytitanium monohalide, tetraalkoxytitanium, and mixtures thereof; wherein:
    (a) the titanium tetrahalide is selected from the group consisting of titanium tetrachloride, titanium tetrabromide and titanium tetraiodide;
    (b) alkoxytitanium trihalide/aryloxytitanium trihalide is selected from the group consisting of methoxytitanium trichloride, ethoxytitanium trichloride, butoxytitanium trichloride and phenoxytitanium trichloride;
    (c) dialkoxy titanium dihalide is diethoxy titanium dichloride;
    (d) trialkoxytitanium monohalide is triethoxy titanium chloride; and
    (e) tetraalkoxytitanium is selected from the group consisting of tetrabutoxy titanium and tetraethoxy titanium.

17. The process as claimed in claim 1, wherein the internal electron donor used is selected from the group consisting of phthalates, benzoates, diethers, succinates, malonates, carbonates and combinations thereof; wherein:
    a. the phthalate is selected from the group consisting of di-n-butyl phthalate, di-i-butyl phthalate, and di-2-ethylhexyl phthalate;
    b. the benzoate is selected from the group consisting of methyl benzoate, ethyl benzoate, propyl benzoate, phenyl benzoate, cyclohexyl benzoate, methyl toluate, ethyl toluate, p-ethoxy ethyl benzoate and p-isopropoxy ethyl benzoate;
    c. the succinate is selected from the group consisting of diethyl succinate, di-propyl succinate, diisopropyl succinate, dibutyl succinate and diisobutyl succinate,
    d. the malonate is selected from the group consisting of diethyl malonate, diethyl ethylmalonate, diethyl propyl malonate, diethyl isopropylmalonate and diethyl butylmalonate;

e. the diether compound is selected from consisting of 9,9-bis(methoxymethyl)fluorene, 2-isopropyl-2-isopentyl-1,3-dimethoxypropane, 2,2-diisobutyl-1,3-dimethoxypropane, 2,2-diisopentyl-1,3-dimethoxypropane and 2-isopropyl-2-cyclohexyl-1,3-dimethoxypropane; and f. the carbonate compound is selected from the group consisting of diethyl 1,2-cyclohexanedicarboxylate, di-2-ethylhexyl 1,2-cyclohexanedicarboxylate, di-2-isononyl 1,2-cyclohexanedicarboxylate, methyl anisate and ethyl anisate.

18. The process as claimed in claim 1, wherein the inert solvent is selected from the group consisting of a chlorinated aromatic solvent, a non-chlorinated aromatic solvent, a chlorinated aliphatic solvent and a non-chlorinated aliphatic solvent.

19. The process as claimed in claim 18, wherein the inert solvent is selected from the group consisting of benzene, decane, kerosene, ethyl benzene, chlorobenzene, dichlorobenzene, toluene, o-chlorotoluene, xylene, dichloromethane, chloroform and cyclohexane.

20. The process as claimed in claim 1, wherein said solid titanium catalyst component comprises a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 μm, characterized by a three point particle size distribution of D10 in the range of 1 to 10 μm; D50 in the range of 5 to 25 μm and D90 in the range of 15 to 50 μm.

21. The process as claimed in claim 1, wherein the solid titanium catalyst component is used in preparing a Ziegler-Natta catalyst system, said catalyst system comprising a combination of at least one organoaluminum compound, at least one external electron donor and a solid titanium catalyst component as claimed in claim 20 comprising a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 μm, characterized by a three point particle size distribution of D10 in the range of 1 to 10 μm; D50 in the range of 5 to 25 μm and D90 in the range of 15 to 50 μm.

22. The process as claimed in claim 21, wherein the external electron donor and the internal donor are same or different.

23. The process as claimed in claim 21, wherein a ratio between titanium (from the solid titanium catalyst component):aluminum (from organoaluminum compound):external donor is in the range of 1:5-1000:0-250 and is preferably in the range of 1:25-500:25-100.

24. The process as claimed in claim 21, wherein the Ziegler-Natta catalyst system is used in a method of polymerizing and/or copolymerizing olefins, said method comprising the step of contacting an olefin having C2 to C20 carbon atoms under a polymerizing condition with the Ziegler-Natta catalyst system, said catalyst system comprising a combination of at least one organoaluminum compound, at least one external electron donor and a solid titanium catalyst component comprising a combination of 15 to 20 wt % of a magnesium moiety, 1.0 to 6.0 wt % of a titanium moiety and 5.0 to 20 wt % of an internal donor, said solid titanium catalyst component has an average particle size in the range of 1 to 100 μm, characterized by a three point particle size distribution of D10 in the range of 1 to 10 μm; D50 in the range of 5 to 25 μm and D90 in the range of 15 to 50 μm.

\* \* \* \* \*